(12) United States Patent
Chang

(10) Patent No.: US 11,959,284 B2
(45) Date of Patent: Apr. 16, 2024

(54) SIDING SPLICE JOINT

(71) Applicant: C & H INTERNATIONAL CORPORATION, Kaohsiung (TW)

(72) Inventor: Yuan-Chih Chang, Kaohsiung (TW)

(73) Assignee: C & H INTERNATIONAL CORPORATION, Kaohsiung (TW)

( * ) Notice: Subject to any disclaimer, the term of this patent is extended or adjusted under 35 U.S.C. 154(b) by 335 days.

(21) Appl. No.: 17/381,323

(22) Filed: Jul. 21, 2021

(65) Prior Publication Data

US 2023/0023733 A1    Jan. 26, 2023

(51) Int. Cl.
| E04B 2/00 | (2006.01) |
| E04F 13/08 | (2006.01) |
| F16B 5/00 | (2006.01) |

(52) U.S. Cl.
CPC ........ E04F 13/0832 (2013.01); F16B 5/0004 (2013.01)

(58) Field of Classification Search
CPC .... F16B 5/0004; E04F 13/083; E04F 13/0832
See application file for complete search history.

(56) References Cited

U.S. PATENT DOCUMENTS

| 2,446,311 | A | * | 8/1948 | Traxler | .................. F16G 7/00 |
| | | | | | 156/140 |
| 3,558,005 | A | * | 1/1971 | Crabtree | ................ B64D 1/02 |
| | | | | | 221/90 |
| 3,707,226 | A | * | 12/1972 | Wippermann | ........ A47B 57/06 |
| | | | | | 206/346 |
| 3,852,931 | A | * | 12/1974 | Morse | ..................... E04B 1/98 |
| | | | | | 52/293.3 |
| 3,892,313 | A | * | 7/1975 | Lange | .................. B25C 1/005 |
| | | | | | 206/346 |
| 4,070,945 | A | * | 1/1978 | Kurosaki | ............. F16B 37/043 |
| | | | | | 411/182 |
| 4,295,691 | A | * | 10/1981 | Rubenthaler | ........ F16F 1/3732 |
| | | | | | 174/152 G |
| 4,564,232 | A | * | 1/1986 | Fujimori | ................ B60R 13/04 |
| | | | | | 403/14 |
| D342,940 | S | * | 1/1994 | Chockran | .................... D13/173 |
| 5,335,893 | A | * | 8/1994 | Opp | ....................... B64C 1/066 |
| | | | | | 403/228 |
| 5,352,077 | A | * | 10/1994 | Lind | ................... E04F 13/0832 |
| | | | | | 411/72 |

(Continued)

*Primary Examiner* — Basil S Katcheves
(74) *Attorney, Agent, or Firm* — Demian K. Jackson; Jackson IPG PLLC

(57) ABSTRACT

A siding splice joint contains: a body, multiple washers, and multiple screws. The body includes a first face, a second face, and multiple through holes. A respective washer is injection molded on a respective through hole and includes a thin portion, a thick portion, a connection portion, and a lock orifice. The thick portion of the respective washer is connected on the first face, the thick portion of the respective washer is connected on the second face, and the connection portion is inserted through the respective through hole. A respective screw includes a head, an extension shank integrally extending from the head, and a tip formed on the extension shank away from the head. The extension shank is screwed in the locking orifice of the respective washer so that the respective screw is not locked on but connected with the respective washer.

5 Claims, 12 Drawing Sheets

(56) References Cited

U.S. PATENT DOCUMENTS

| | | | | |
|---|---|---|---|---|
| 5,429,467 | A * | 7/1995 | Gugle | F16B 5/0225 |
| | | | | 411/908 |
| 5,460,348 | A * | 10/1995 | Cox | F16M 5/00 |
| | | | | 248/237 |
| 5,738,476 | A * | 4/1998 | Assimakopoulos | F16B 37/043 |
| | | | | 411/182 |
| 8,235,350 | B2 * | 8/2012 | Tetsuda | B60T 8/3685 |
| | | | | 248/560 |
| 8,408,506 | B2 * | 4/2013 | Yu | H05K 7/1489 |
| | | | | 248/220.22 |
| D804,227 | S * | 12/2017 | Jung | D6/703 |
| 2003/0182828 | A1 * | 10/2003 | Schmidt | B60R 13/105 |
| | | | | 40/200 |
| 2014/0305046 | A1 * | 10/2014 | Stearns | E04D 3/38 |
| | | | | 52/704 |
| 2019/0277325 | A1 * | 9/2019 | Andersag | F16B 25/0063 |
| 2021/0102368 | A1 * | 4/2021 | Schwab | E04B 1/36 |
| 2021/0107686 | A1 * | 4/2021 | Hitchcock | B64C 1/403 |
| 2021/0388626 | A1 * | 12/2021 | Cipriani | E04F 15/02044 |

* cited by examiner

SIDING SPLICE JOINT

BACKGROUND OF THE INVENTION

Field of the Invention

The present invention relates to a splice joint, and more particularly to a siding splice joint.

Description of the Prior Art

To achieve beautification and different visual experiences to walls of common buildings, most of the walls will be adhered tiles, coated paint, connected siding splices, adhered wallpapers, etc.

When connecting siding splices on the walls of the buildings, the siding splices are connected on the walls side by side, wherein two adjacent siding splices are connected side by side to achieve an exact alignment, so a siding splice joint is connected between the two adjacent siding splices to connect the two adjacent siding splices firmly.

The siding splice joint contains multiple through holes defined on two sides of a body so that the body is connected between the two adjacent siding splices, and multiple screws are inserted through and locked with the multiple through holes of the body, thus connecting the two adjacent siding splices.

However, a user has to carry a lot of the screws, and the screws are taken out from an accommodation bag and inserted through and locked with the multiple through holes of the body, thus causing troublesome and heavy connection. Furthermore, when taking the screws out of the accommodation bag, it is easy to drop the screws. The body does not have anti-slip and waterproof functions, so the body will slide and is fixed on an inexact position when being connected between the two adjacent siding splices, thus having additional waterproof process, poor utility and using convenience.

The present invention has arisen to mitigate and/or obviate the afore-described disadvantages.

SUMMARY OF THE INVENTION

The primary object of the present invention is to provide a siding splice joint which contains multiple screws, and a respective screw is connected on a body of the siding splice joint directly so as to avoid carrying a lot of screws, have a quick connection and prevent a careless dropping of the respective screw.

Another object of the present invention is to provide a siding splice joint which contains multiple washers, wherein a respective washer is connected with a respective through hole of multiple through holes of the body so as to avoid sliding and to achieve a waterproof purpose and to align and connect the body with the respective screw easily.

To obtain above-mentioned aspect, a siding splice joint provided by the present invention contains: a body, multiple washers, and multiple screws.

The body includes a first face, a second face, and multiple through holes defined on two sides of the body.

A respective washer is injection molded on a respective through hole of the body, and the respective washer includes a thin portion formed on a first end of the respective washer, a thick portion formed on a second end of the respective washer, a connection portion connected between the thin portion and the thick portion, and a lock orifice defined between a center of the respective washer and passing through the thick portion, the connection portion, and the thick portion. The thick portion of the respective washer is connected on the first face of the body, the thick portion of the respective washer is connected on the second face of the body, and the connection portion is inserted through the respective through hole of the body.

A respective screw includes a head, an extension shank integrally extending from the head, and a tip formed on the extension shank away from the head, wherein the extension shank is screwed in the locking orifice of the respective washer so that the respective screw is not locked on but connected with the respective washer.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
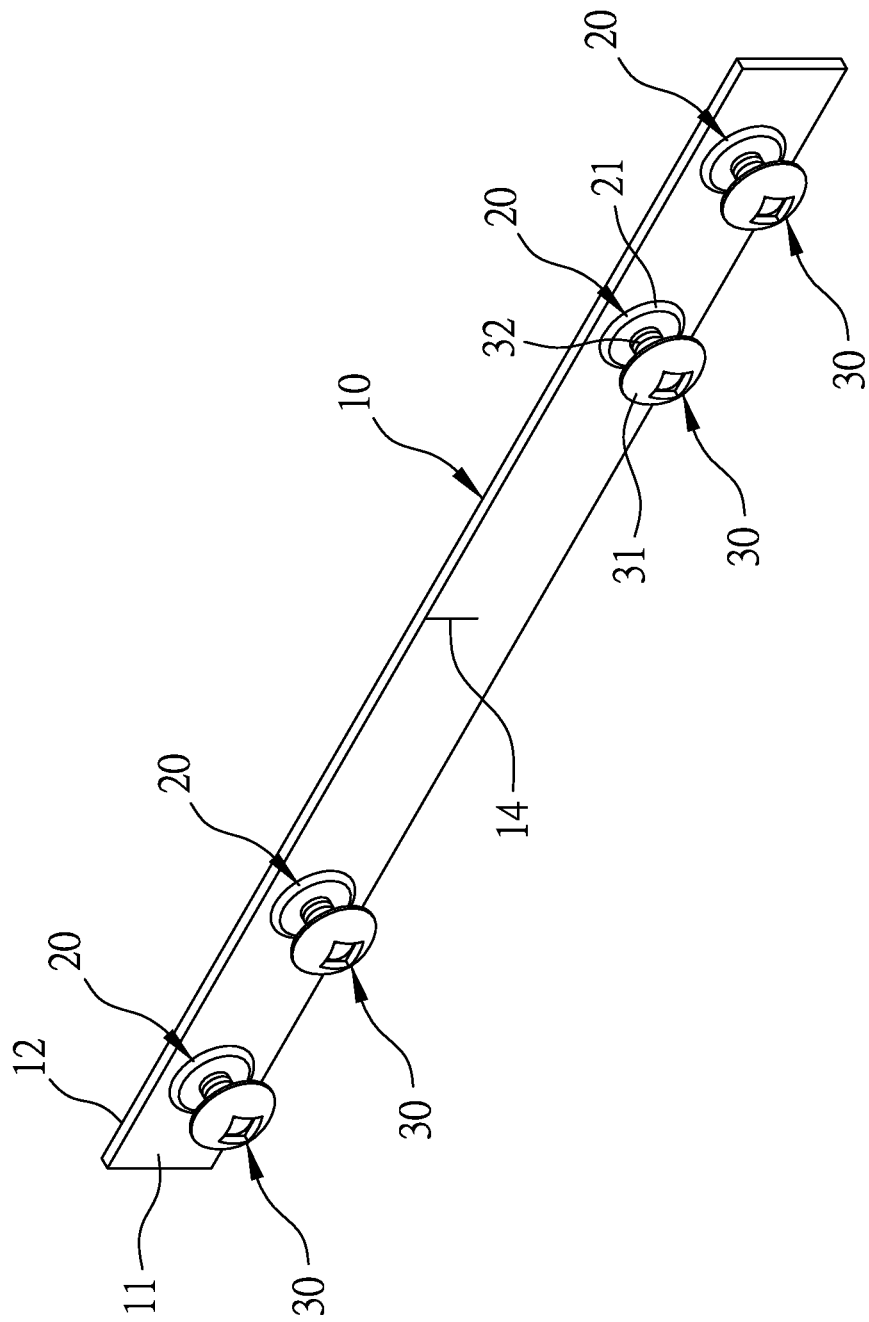
FIG. 1 is a perspective view showing the assembly of a siding splice joint according to a preferred embodiment of the present invention.
Figure 2:
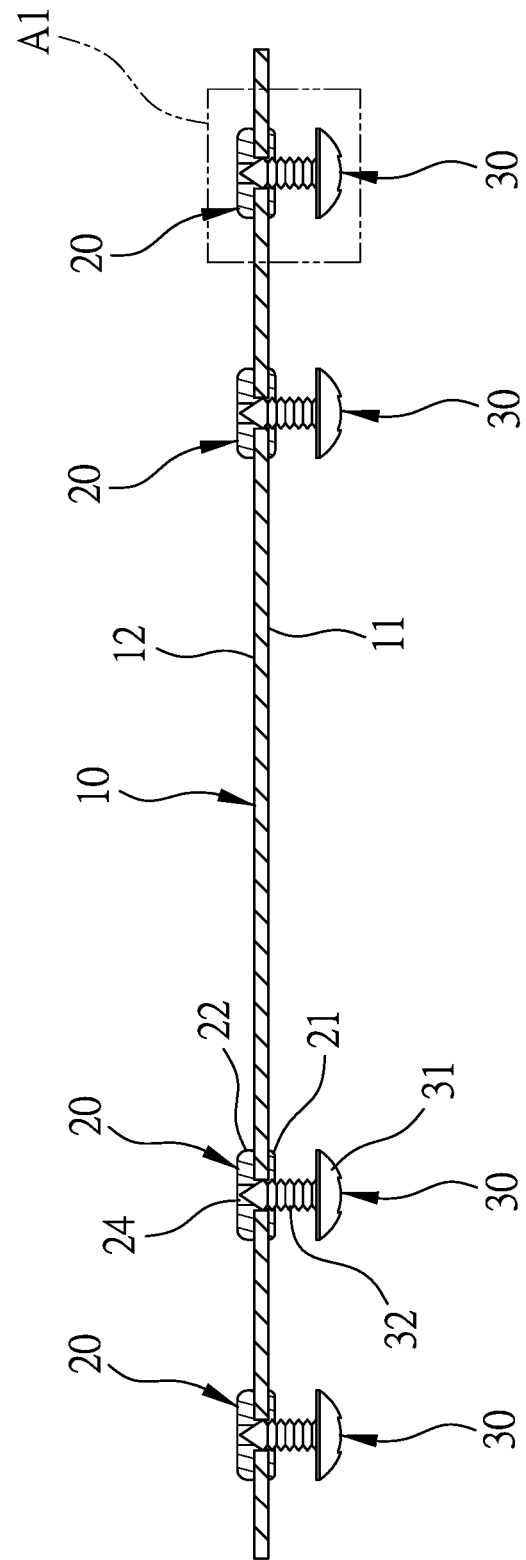
FIG. 2 is a cross sectional view showing the assembly of the siding splice joint according to the preferred embodiment of the present invention.
Figure 3:
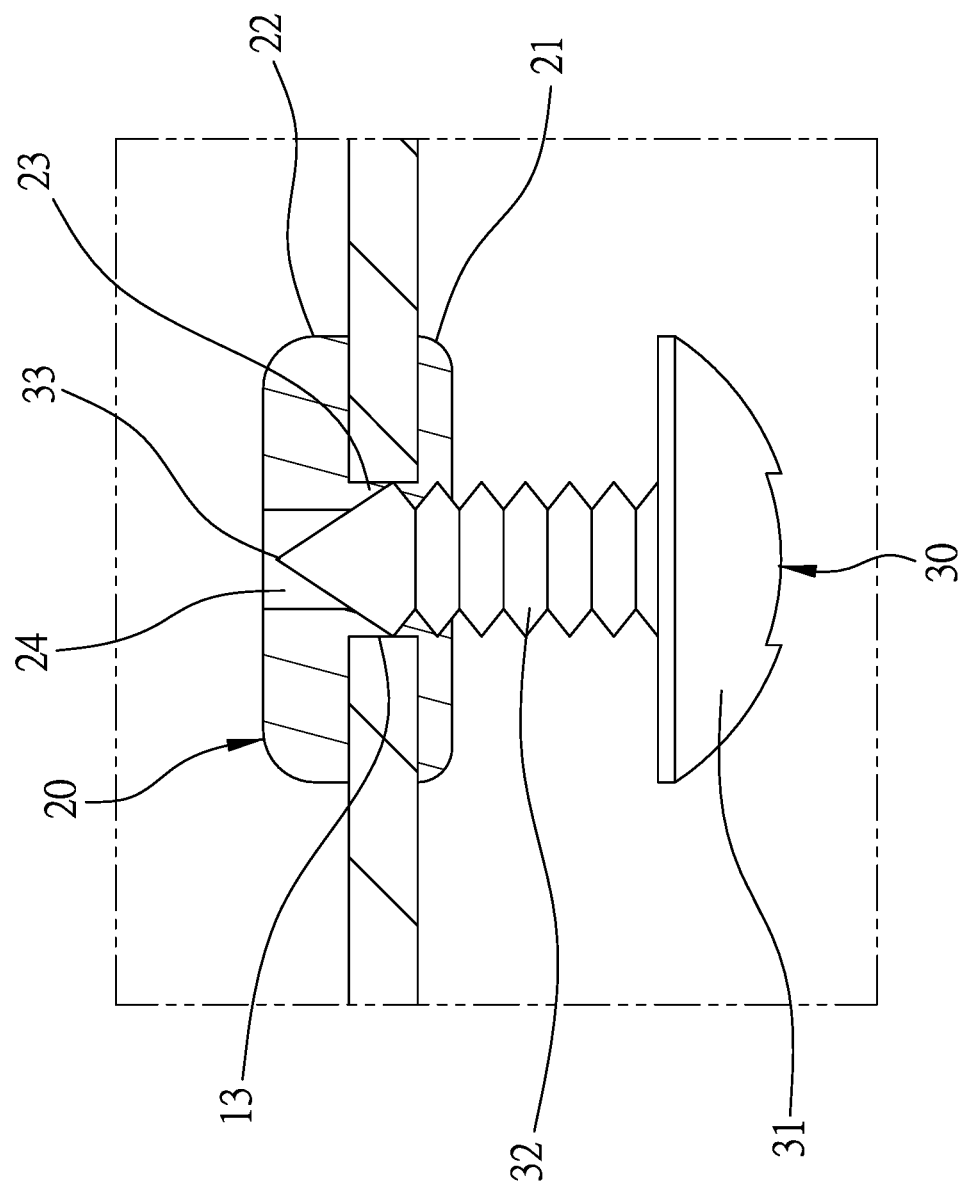
FIG. 3 is an amplified view of a portion A1 of FIG. 2.
Figure 4:
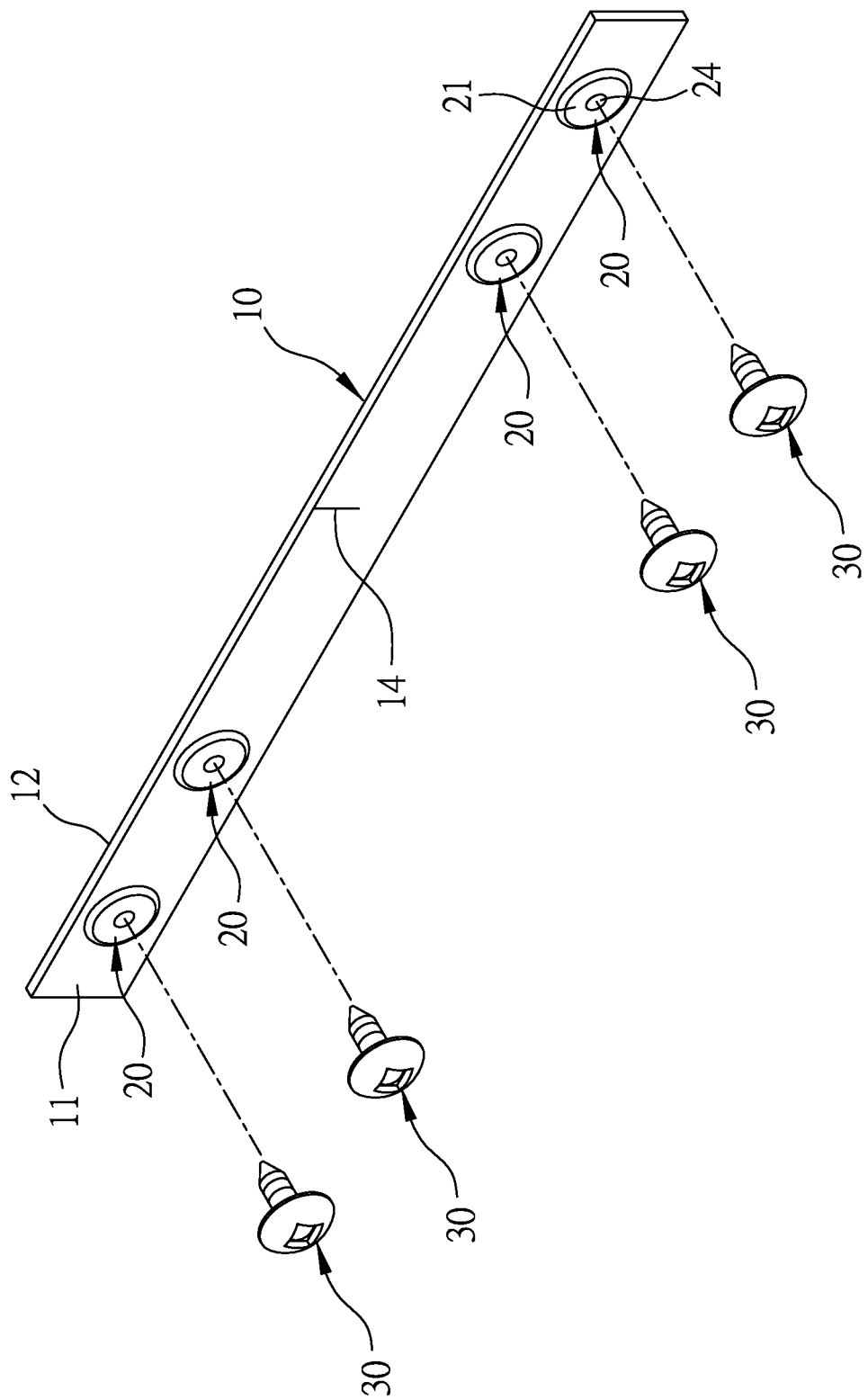
FIG. 4 is a perspective view showing the exploded components of the siding splice joint according to the preferred embodiment of the present invention.
Figure 5:
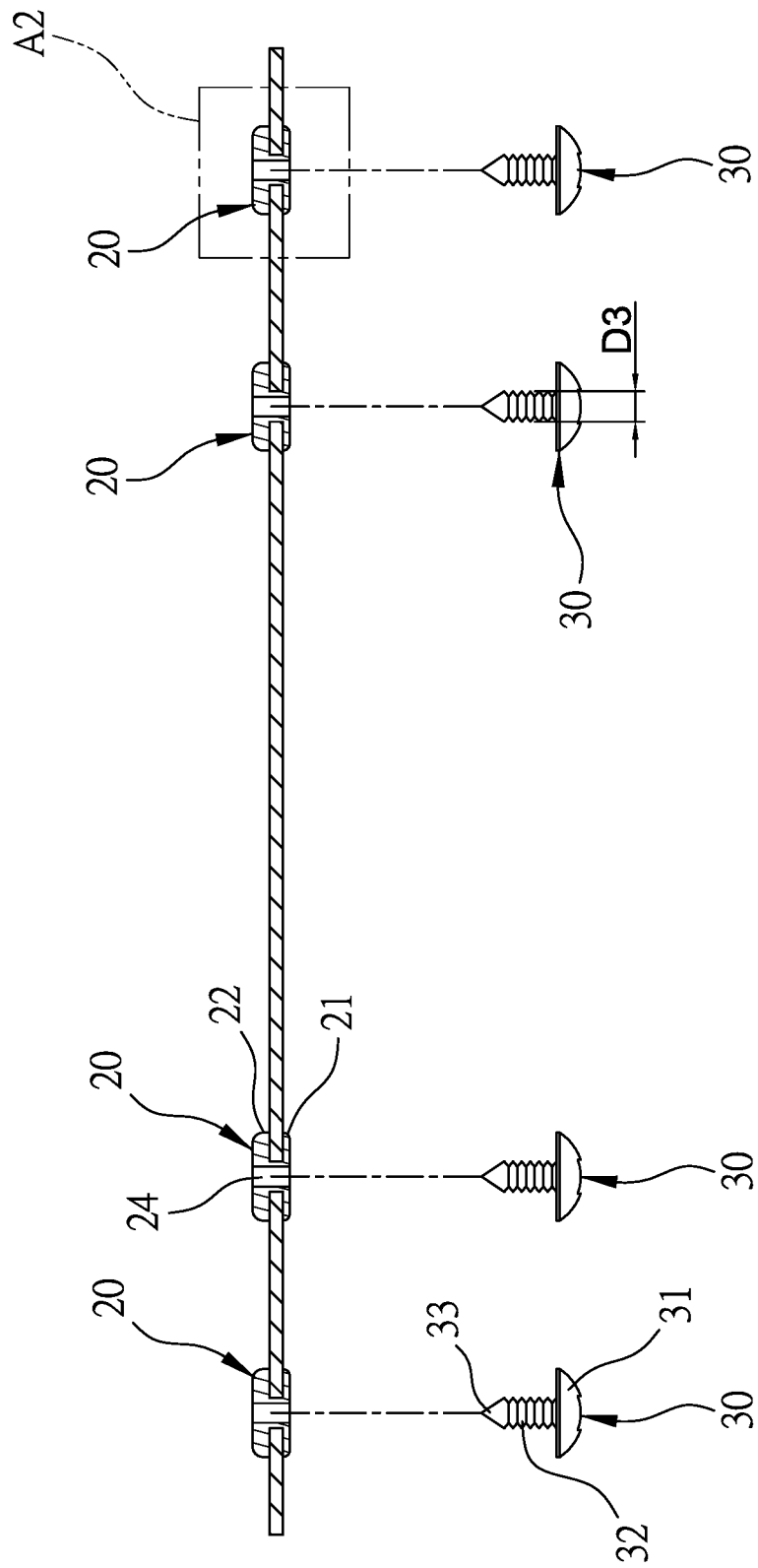
FIG. 5 is a cross sectional view showing the exploded components of the siding splice joint according to the preferred embodiment of the present invention.
Figure 6:
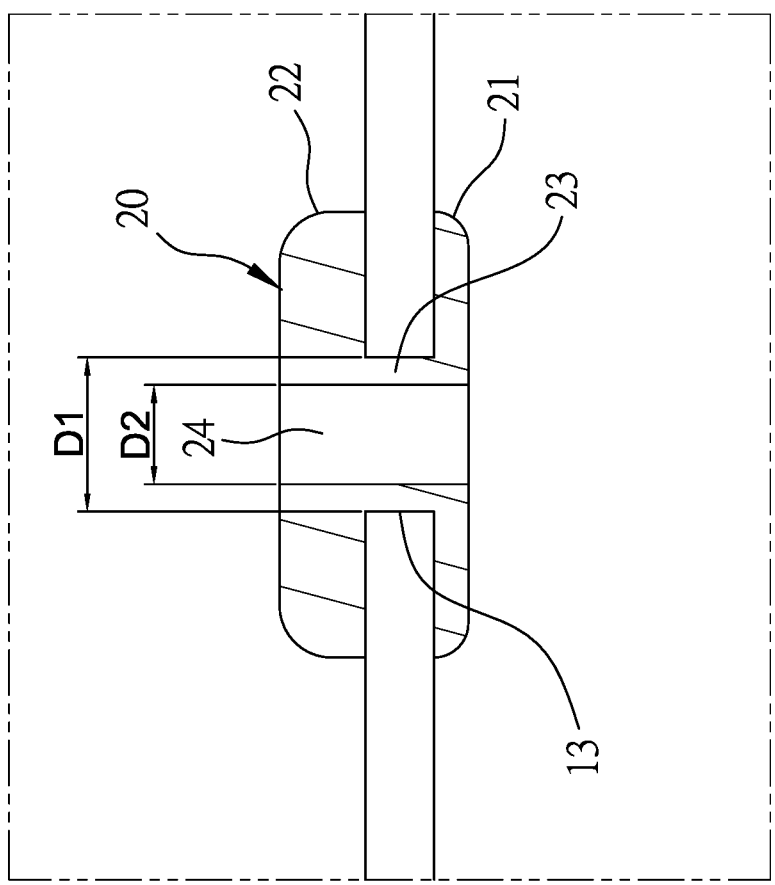
FIG. 6 is an amplified view of a portion A2 of FIG. 5.

With reference to FIGS. 1-6, a siding splice joint according to a preferred embodiment of the present invention comprises: a body 10, multiple washers 20, and multiple screws 30.

The body 10 includes a first face 11, a second face 12, multiple through holes 13 defined on two sides of the body 10, and a datum line 14.

A respective washer 20 is made of flexible material and is injection molded on a respective through hole 13 of the body 10, and the respective washer 20 includes a thin portion 21 formed on a first end thereof, a thick portion 22 formed on a second end of the respective washer 20, a connection portion 23 connected between the thin portion 21 and the thick portion 22, and a lock orifice 24 defined between a center of the respective washer 20 and passing through the thick portion 22, the connection portion 23, and the thick portion 22, wherein the thick portion 22 of the respective washer 20 is connected on the first face 11 of the body 10, the thick portion 22 of the respective washer 20 is connected on the second face 12 of the body 10, and the connection portion 23 is inserted through the respective through hole 13 of the body 10.

A respective screw 30 includes a head 31, an extension shank 32 integrally extending from the head 31, and a tip 33 formed on the extension shank 32 away from the head 31, wherein a diameter D3 of the extension shank 32 is more than a diameter D2 of the lock orifice 24 of the respective washer 20, and a diameter D3 of the extension shank 32 is less than a diameter D1 of the respective through hole 13 of the body 10, wherein the extension shank 32 is screwed in the locking orifice 24 of the respective washer 20 so that the respective screw 30 is not locked on but connected with the respective washer 20.

Figure 7:
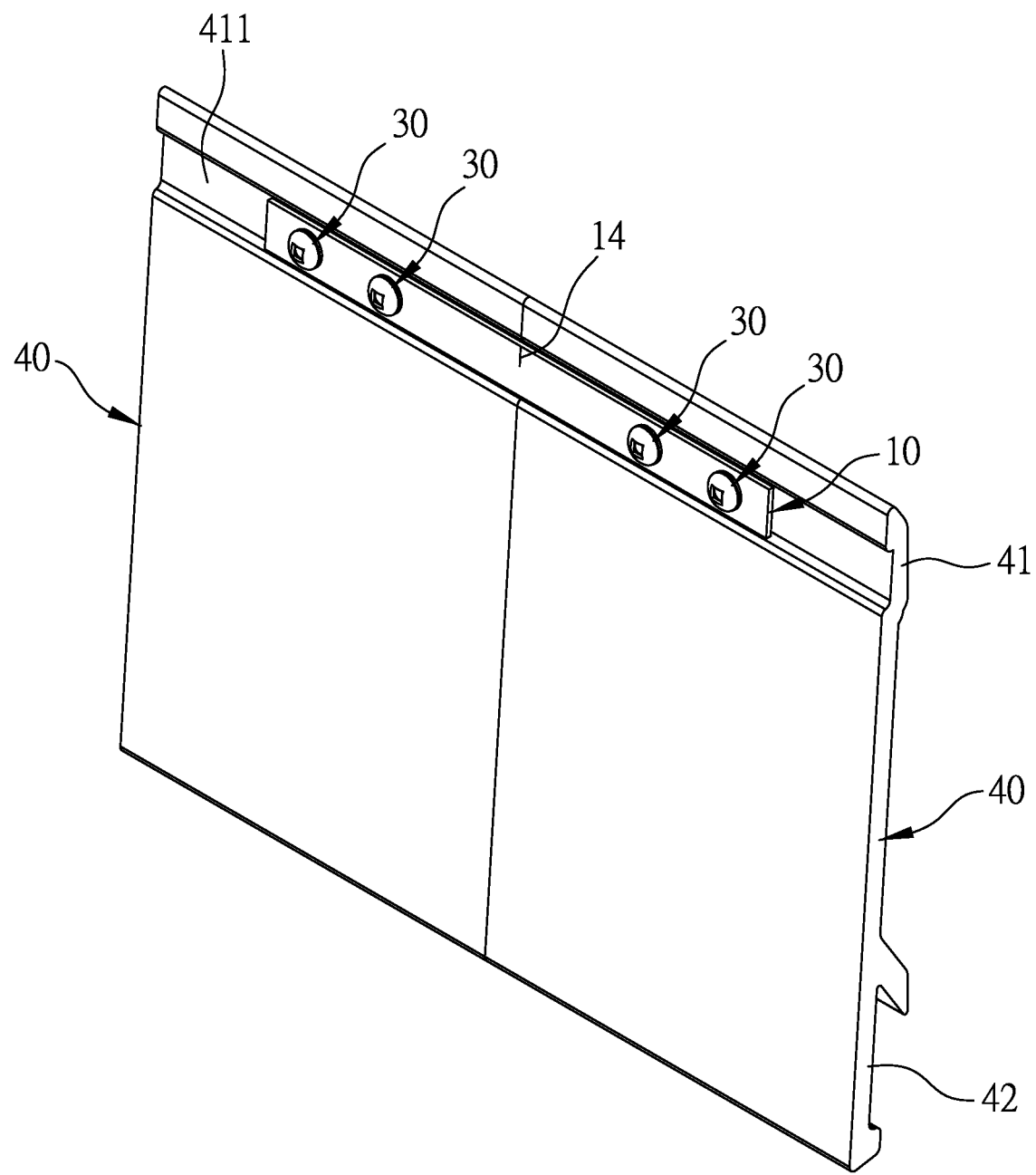
FIG. 7 is a perspective view showing the application of the siding splice joint according to the preferred embodiment of the present invention.
Figure 8:
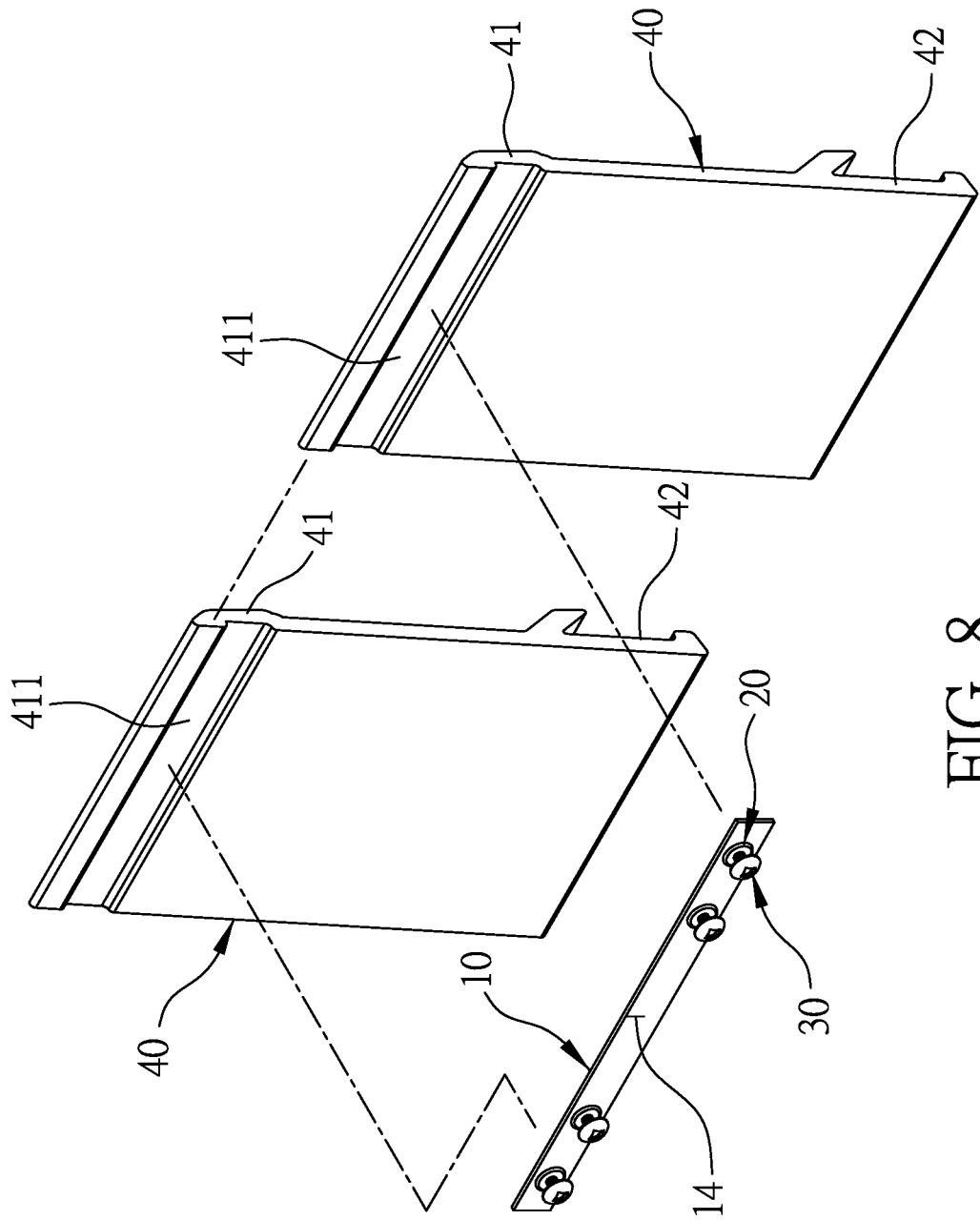
FIG. 8 is another perspective view showing the application of the siding splice joint according to the preferred embodiment of the present invention.
Figure 9:
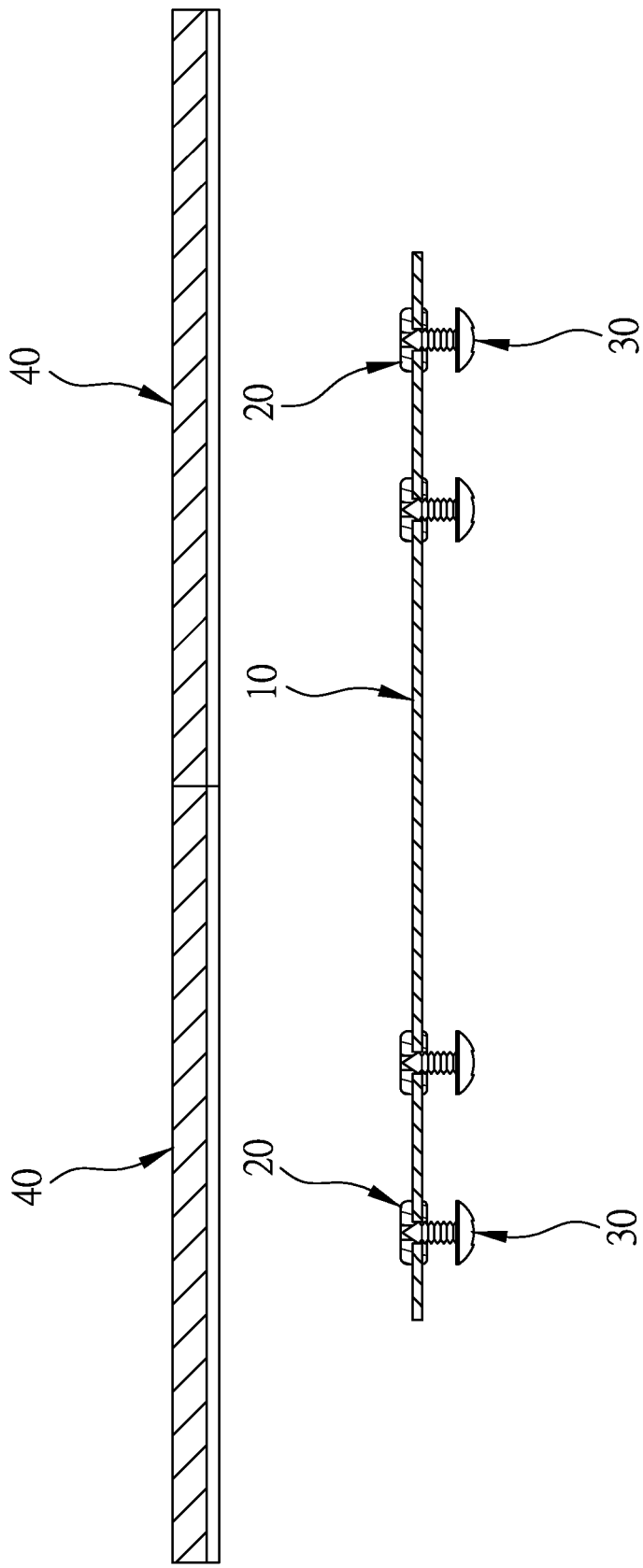
FIG. 9 is a cross sectional view showing the application of the siding splice joint according to the preferred embodiment of the present invention.
Figure 10:
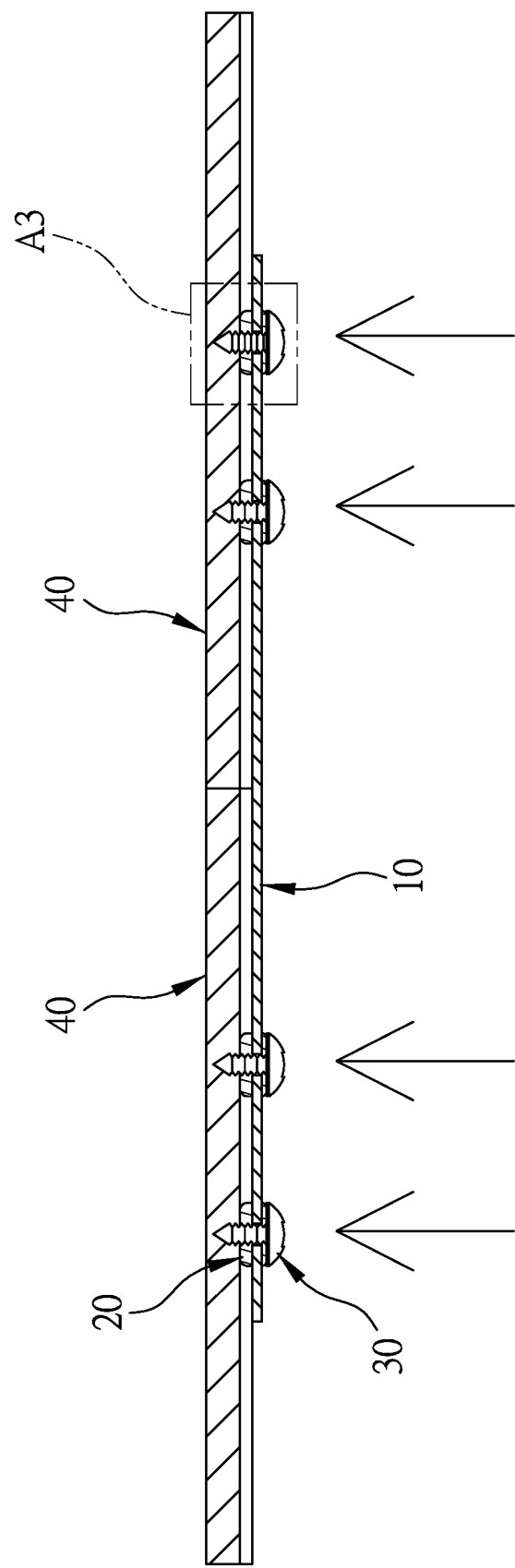
FIG. 10 is another cross sectional view showing the application of the siding splice joint according to the preferred embodiment of the present invention.
Figure 11:
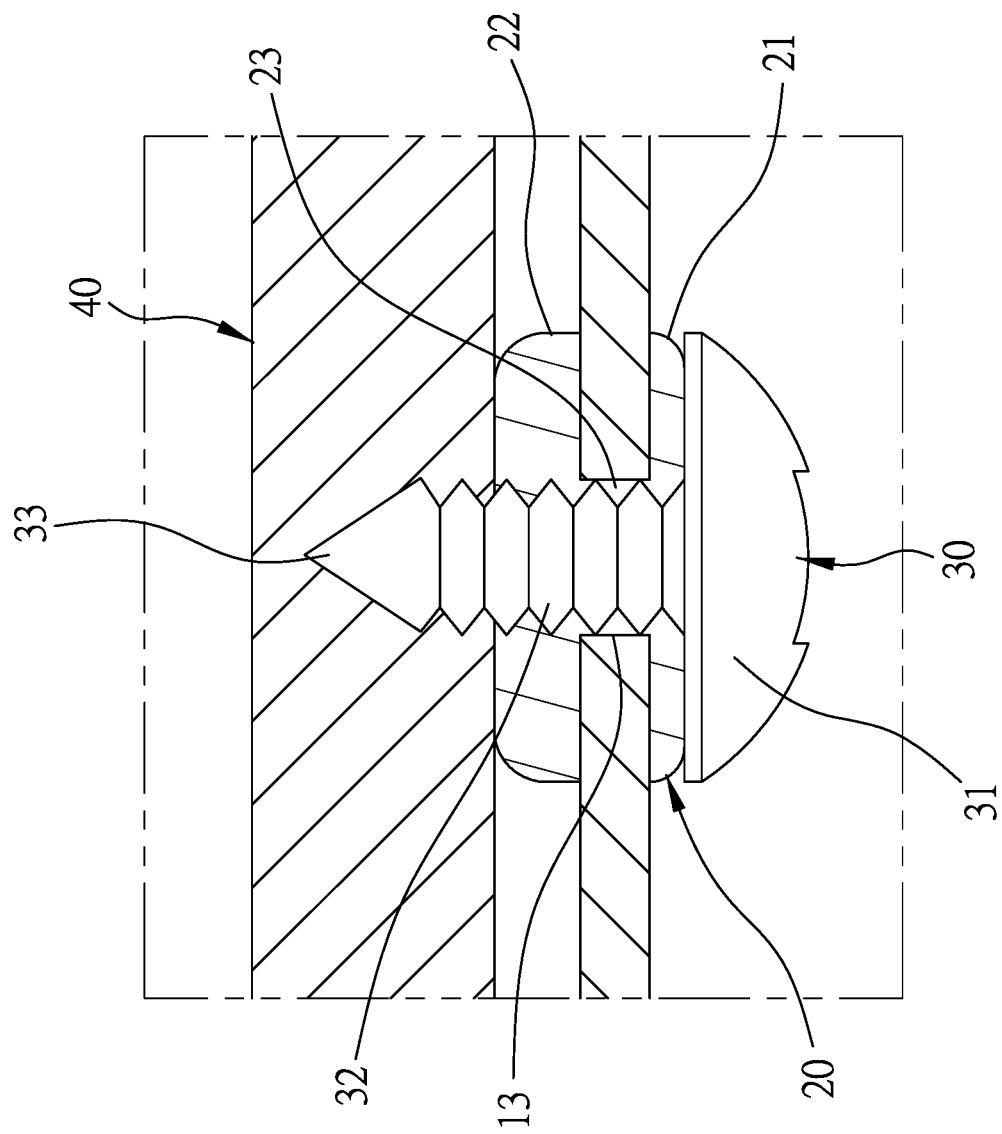
FIG. 11 is an amplified view of a portion A3 of FIG. 10.
Figure 12:
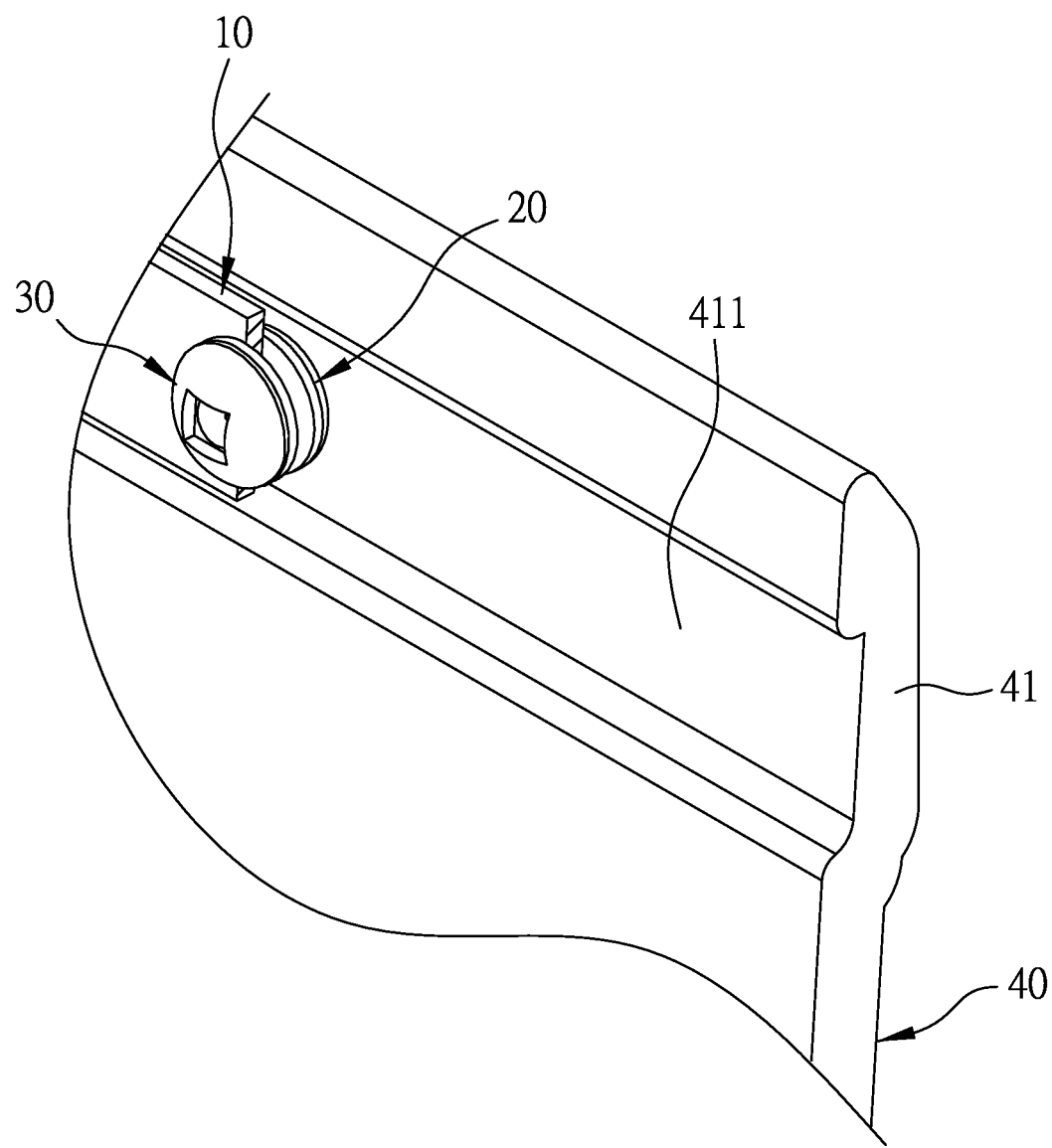
FIG. 12 is a cross sectional perspective view showing the application of the siding splice joint according to the preferred embodiment of the present invention.

Referring to FIGS. 7-12, the siding splice joint is applied to connect two siding splices 40 side by side, wherein a respective siding splice 40 includes a fixing portion 41 formed on a top thereof, and the respective siding 40 includes a joining portion 42 formed on a bottom of the respective siding splice 40, wherein the fixing portion 41 of the respective siding splice 40 has a recess 41 defined on an end thereof and is connected with the joining portion 42 so as to shield the fixing portion 41 of the respective siding splice 40. In application, the body 10 is connected between two recesses 411 of the two siding splices 40, the datum line 14 of the first face 11 of the body 10 is configured to align with a connection line between the two siding splices 40, and the thick portion 22 of the respective washer 20 contacts with the respective siding splice 40 to obtain an anti-slip effect so as to adjustably align with the body 10 easily and to avoid an alignment error after sliding. Then, the respective screw 30 is locked to the respective siding splice 40 by using a tool so that the tip 33 of the respective screw 30 is screwed and connected with the respective siding splice 40, the head 31 of the respective screw 30 abuts against the thin portion 21 of the respective washer 20, and the thick portion 22 of the respective splice 20 contacts between the body 10 and the respective siding splice 40 so as to connect the two siding splices 40 firmly, thus having secure connection.

Thereby, the siding splice joint of the present invention has advantages as follows:

1. The respective screw 30 of the siding splice joint is connected on the body 10 directly to avoid carrying a lot of screws, for example, the body 10 is connected between the two siding splices 40 so that the respective screw 30 is locked on the respective siding splice 40 by ways of the tool to connect the two siding splices 40 side by side, thus having quick connection and preventing a careless dropping of the respective screw.

2. The respective through hole 13 of the body 10 is injection molded on the respective washer 20 so that the respective washer 20 is used to avoid sliding and to achieve a waterproof purpose when connecting the body 10 between the two siding splices 40, to align and connect the body 10 easily, and to lock the respective screw 30 easily.

While various embodiments in accordance with the present invention have been shown and described, it is clear to those skilled in the art that further embodiments may be made without departing from the scope of the present invention.

What is claimed is:

1. A siding splice joint comprising:
   a body including a first face, a second face, and multiple through holes defined on two sides of the body;
   multiple washers, a respective washer being injection molded on a respective through hole of the body, and the respective washer a thin portion formed on a first end of the respective washer, a thick portion formed on a second end of the respective washer, a connection portion connected between the thin portion and the thick portion, and a lock orifice defined between a center of the respective washer and passing through the thick portion, the connection portion, and the thick thin portion, wherein the thick portion of the respective washer is connected on the first face of the body, the thick portion of the respective washer is connected on the second face of the body, and the connection portion is inserted through the respective through hole of the body; and
   multiple screws, a respective screw including a head, a threaded extension shank integrally extending from the head, and a tip formed on the threaded extension shank away from the head, wherein the threaded extension shank extends through the through hole of the body and abuts the through hole, wherein the threaded extension shank is screwed in the locking orifice of the respective washer so that the respective screw is not locked on but connected with the respective washer.

2. The siding splice joint as claimed in claim 1, wherein the body includes a datum line connected on a center of the first face thereof.

3. The siding splice joint as claimed in claim 1, wherein the respective washer is made of flexible material.

4. The siding splice joint as claimed in claim 1, wherein a diameter of the extension shank is more than a diameter of the lock orifice of the respective washer, and a diameter of the extension shank is less than a diameter of the respective through hole of the body.

5. The siding splice joint as claimed in claim 1, wherein the thin portion of the respective washer is configured to abut against the head of the respective screw.

* * * * *